US009024912B2

(12) United States Patent
Atkinson et al.

(10) Patent No.: US 9,024,912 B2
(45) Date of Patent: May 5, 2015

(54) BASELINE RECALCULATION AFTER FREQUENCY RECONFIGURATION OF A MUTUAL CAPACITIVE TOUCH CONTROLLER

(71) Applicant: Broadcom Corporation, Irvine, CA (US)

(72) Inventors: Ian Atkinson, Hayward, CA (US); Sumant Ranganathan, Saratoga, CA (US); Federico Cattivelli, Newport Beach, CA (US); Glen Weaver, San Jose, CA (US); John Walley, Ladera Ranch, CA (US); Tianhao Li, Tustin, CA (US); David Sobel, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 182 days.

(21) Appl. No.: 13/732,208

(22) Filed: Dec. 31, 2012

(65) Prior Publication Data

US 2014/0125623 A1    May 8, 2014

Related U.S. Application Data

(60) Provisional application No. 61/724,287, filed on Nov. 8, 2012.

(51) Int. Cl.
*G06F 3/045* (2006.01)
*G06F 3/044* (2006.01)

(52) U.S. Cl.
CPC ...................................... *G06F 3/044* (2013.01)

(58) Field of Classification Search
CPC ........................................................ G06F 3/044
USPC ............................. 345/174, 173, 156
See application file for complete search history.

(56) References Cited

U.S. PATENT DOCUMENTS

| | | | |
|---|---|---|---|
| 2008/0024455 A1* | 1/2008 | Lee et al. ...................... | 345/173 |
| 2012/0268415 A1* | 10/2012 | Konovalov et al. ............ | 345/174 |
| 2013/0050144 A1* | 2/2013 | Reynolds ....................... | 345/174 |
| 2013/0169583 A1* | 7/2013 | Konradi et al. ................ | 345/174 |
| 2013/0169584 A1* | 7/2013 | Konradi et al. ................ | 345/174 |
| 2013/0176273 A1 | 7/2013 | Li et al. | |
| 2014/0022201 A1* | 1/2014 | Boychuk et al. ............... | 345/174 |
| 2014/0049501 A1* | 2/2014 | Santos et al. .................. | 345/174 |
| 2014/0092031 A1* | 4/2014 | Schwartz et al. ............. | 345/173 |
| 2014/0092063 A1* | 4/2014 | Krah et al. .................... | 345/174 |

\* cited by examiner

*Primary Examiner* — Thuy Pardo
(74) *Attorney, Agent, or Firm* — Garlick & Markison; Bruce E. Garlick (57) ABSTRACT

Systems and methods are provided that allow a touch sensor, such as a mutual capacitive touch panel, to switch from an operative transmit (TX) frequency at which the mutual capacitive touch panel is driven to an alternative TX frequency. When switching to an alternative TX frequency, an alternative baseline capacitance value corresponding to the alternative TX frequency may be utilized to determine whether a touch event has occurred on the mutual capacitive touch panel. Frame scans can be repeatedly performed at the operative TX frequency and the alternative TX frequency in rapid succession, and an average difference of the frame scans can be calculated and utilized to generate the alternative baseline capacitance value which may be insensitive to sudden ambient changes and moving touch events affecting the mutual touch capacitive panel.

20 Claims, 8 Drawing Sheets

BASELINE RECALCULATION AFTER FREQUENCY RECONFIGURATION OF A MUTUAL CAPACITIVE TOUCH CONTROLLER

TECHNICAL FIELD

The technical field of the present disclosure relates to touch screen devices, and in particular, to calculating and maintaining multiple alternative frequency baselines for use when an active, operating frequency becomes jammed with noise.

BACKGROUND

A touch screen refers to an electronic display that can detect the presence and location of a touch within a display area of the touch screen. A touch/touching generally refers to contact made by a finger, hand, or other body part, but may also refer to contact via objects, such as a stylus. The use of touch screen technology is common in devices such as game consoles and game console controllers, all-in-one computers, tablet computers, and smartphones.

Touch screens allow a user to interact directly with what is being displayed, rather than indirectly with a pointer/cursor controlled by a peripheral control device, such as a mouse. Additionally, that direct interaction may be effectuated without requiring any intermediate device that would need to be held in the hand (other than a stylus, which is optional for most modern touch screens). A device having a touch screen is able to respond to a user's touch, and convey information about that touch to a control circuit of the device. The touch screen of the device is often combined with a generally coextensive display device, such as a liquid crystal display (LCD), to form a user interface for the portable device.

Relative to devices that include a keypad, rollerball, joystick, and/or mouse, a device employing touch screen technology may reduce moving parts, increase durability, increase resistance to contaminants, simply user interaction and increase user interface flexibility.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
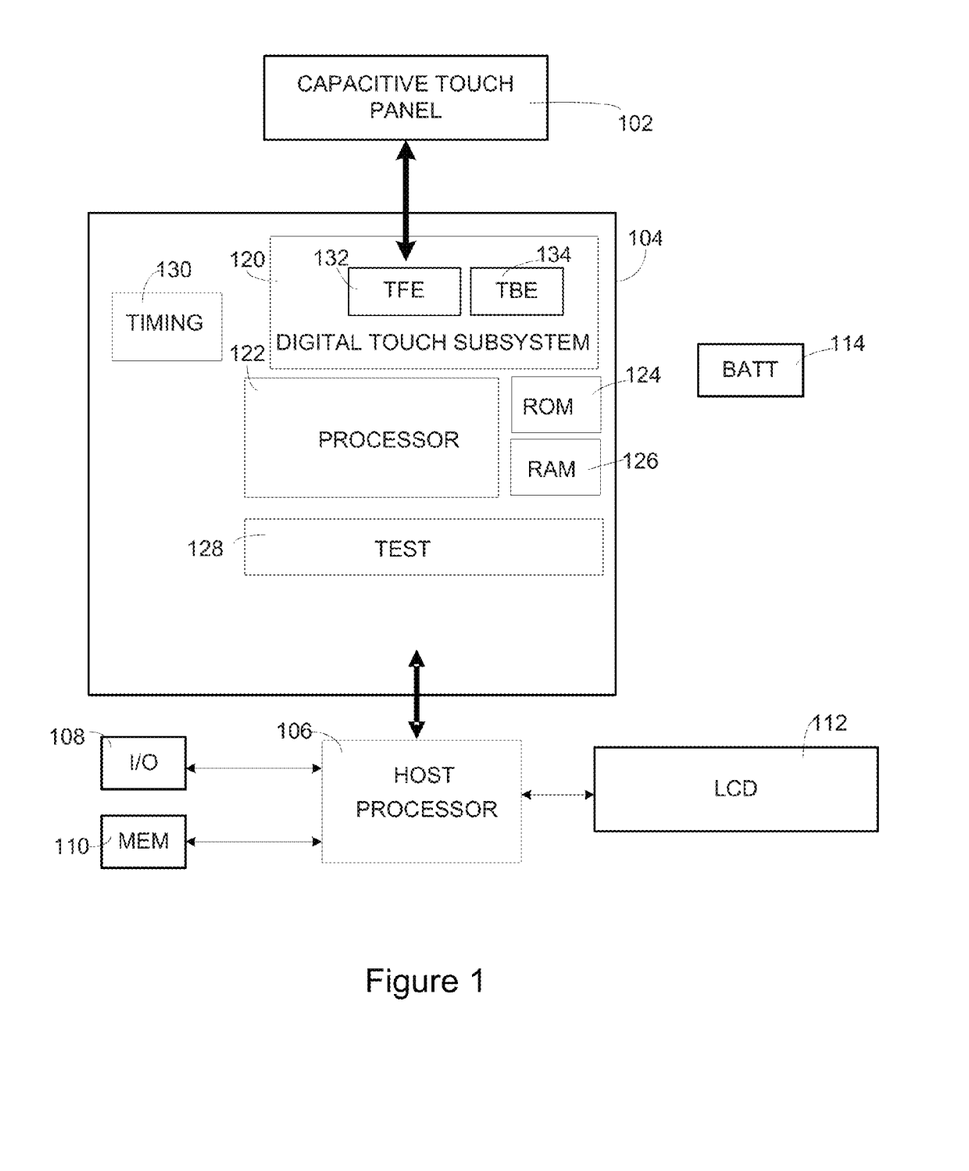
FIG. 1 is an example schematic representation of a device in which various embodiments may be implemented.

FIG. 1 is a schematic representation of a device 100. The device 100 may be any one of a variety of portable or fixed devices including, but not limited to, a smartphone, personal digital assistant (PDA), tablet computer, peripheral input device, etc. having a touch-sensitive surface or display As illustrated in FIG. 1, the device 100 can include a capacitive touch panel 102, a controller circuit 104, a host processor 106, input-output circuitry 108, memory 110, a display 112 (e.g., liquid crystal display (LCD), plasma, etc.), and a power source, such as a battery 114, to provide operating power.

The controller circuit 104 may include, but is not limited to the following components/elements: a digital touch subsystem 120; a processor 122; memory including persistent/read-only memory (ROM) 124 and read-write/random access memory (RAM) 126; a test circuit 128; and a timing circuit 130. In one embodiment, the controller circuit 104 may be implemented as a single integrated circuit including digital logic, memory, and/or analog functions.

The digital touch subsystem 120 may include a touch front end (TFE) 132 and a touch back end (TBE) 134. The respective functionality implemented in the TFE 132 and the TBE 134 may vary in accordance with certain embodiments according to design considerations, requirements, and/or categorizations of front and back-end features. Additionally, the functionality of the TFE 132 and the TBE 134 may be implemented in hardware, software, and/or firmware components. The TFE 132 may detect capacitance of a capacitive sensor, in this instance, the capacitive touch-panel 102, and deliver a high signal-to-noise ratio (SNR) capacitive image, also referred to as a heatmap, to the TBE 134. The TBE 134 can be configured to utilize the heatmap to discriminate, classify, locate, and/or otherwise track an object(s) "touching" the capacitive touch panel 102, and report this information to the host processor 106. As utilized in the context of the present disclosure, the terms touch or touch event refer to some form of contact (whether intended or inadvertent) with the capacitive touch panel 102 by, e.g., one or more fingers, portions of a hand, or other body parts of a user. As well, touch may refer to contact via a stylus or other object(s) with the capacitive touch panel 102.

The processor 122 of the controller circuit 104 can be configured to operate in response to data and instructions stored in memory (e.g. ROM 124 and/or RAM 126) to control the operation of the controller circuit 104. In one embodiment, the processor 122 may be implemented as a reduced instruction set computer (RISC) architecture, for example as implemented in an Advanced/Acorn RISC machine (ARM™) processor available from ARM Holdings. The processor 122 may receive data from and provide data to other elements of the controller circuit 104. For example, and in particular, ROM 124 may store firmware data and/or instructions which can be used by any of, e.g., the aforementioned elements of the controller circuit 104. Such data and/or instructions may be programmed at the time of manufacture of the controller circuit 104 for subsequent use, or may be updated or programmed after manufacture.

The timing circuit 130 can be configured to produce clock signals and/or analog, time-varying signals for use by one or more of the aforementioned elements of the controller circuit 104. The clock signals may include a digital clock signal for synchronizing digital components such as the processor 122, and the analog, time-varying signals may include signals of predetermined frequency and amplitude for driving, for example, the capacitive touch panel 104. Accordingly, in some embodiments, the timing circuit 130 may be thought of as operating under the control of, or responsive to, elements of the controller circuit 104, e.g., the processor 122 or the ROM 124.

Figure 2A:
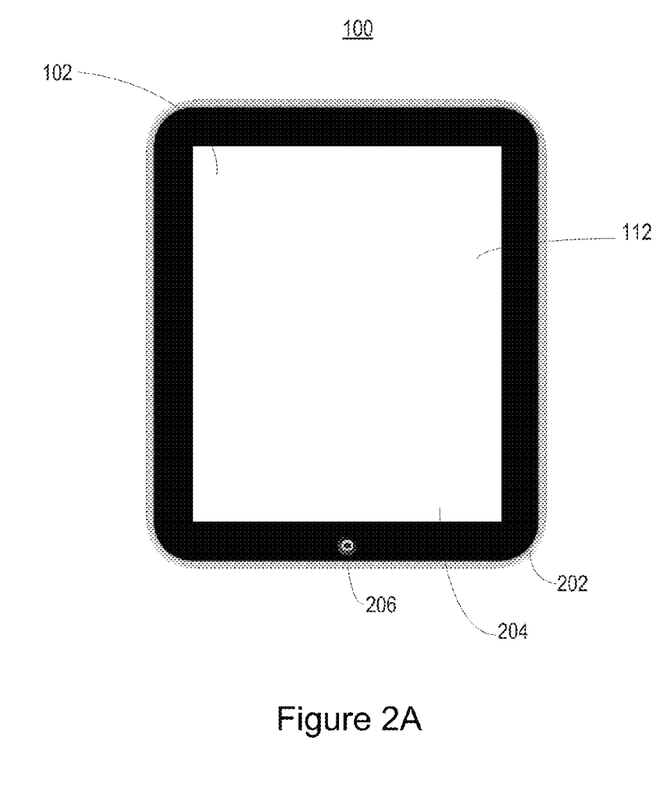
FIG. 2A is a top view of one embodiment of the device of FIG. 1.
Figure 2B:
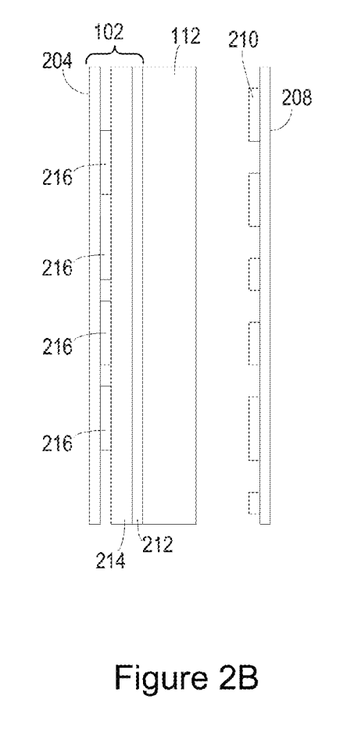
FIG. 2B is a cross-sectional view of one embodiment of the device of FIG. 1.

In accordance with one embodiment, the device 100 may be a tablet computer. FIG. 2A illustrates a top view of one embodiment of the device 100, and FIG. 2B illustrates a cross-sectional view of one embodiment of the device 100. The device 100 may include a housing 202, a lens or clear touch surface 204, and a control switch/button 206.

Contained within the housing 202 may be a printed circuit board 208, and circuit elements 210 arranged on the printed circuit board 208, such as the previously described circuits, elements, etc. illustrated in FIG. 1. The capacitive touch panel 102 may be arranged in a stacked formation including various layers, such as a clear touch surface 204, a parallel array of one or more drive lines 212, an insulator 214, and a parallel array of one or more sense lines 216. The drive line(s) 212 and the sense line(s) 216 can be arranged perpendicularly relative to each other, with the insulator 214 electrically isolating the drive line(s) 212 from the sense line(s) 216. Signals can be provided to the drive line(s) 212 and sensed by the sense line(s) 216 to locate a touch event on the clear touch surface 204, where the display 112 may be located between the printed circuit board 208 and the capacitive touch panel 102.

As illustrated in FIG. 2A, the capacitive touch panel 102 and the display 112 may be generally coexistive, and together may form a user interface for the device 100. For example, text, images, and/or other media, may be displayed on the display 112 for viewing and/or interaction by a user. The user may touch the capacitive touch panel 102 to control operation of the device 100 and/or control the display or playback of the text, images, and other media. In yet another embodiment, the capacitive touch panel 102 may be implemented as a touch pad of a computing device, where the display 112 need not be coexistive (or co-located) with the capacitive touch panel 102. Rather, the display 112 may be located nearby for viewing by a user as he/she touches the capacitive touch panel 102 to control the computing device.

Figure 3:
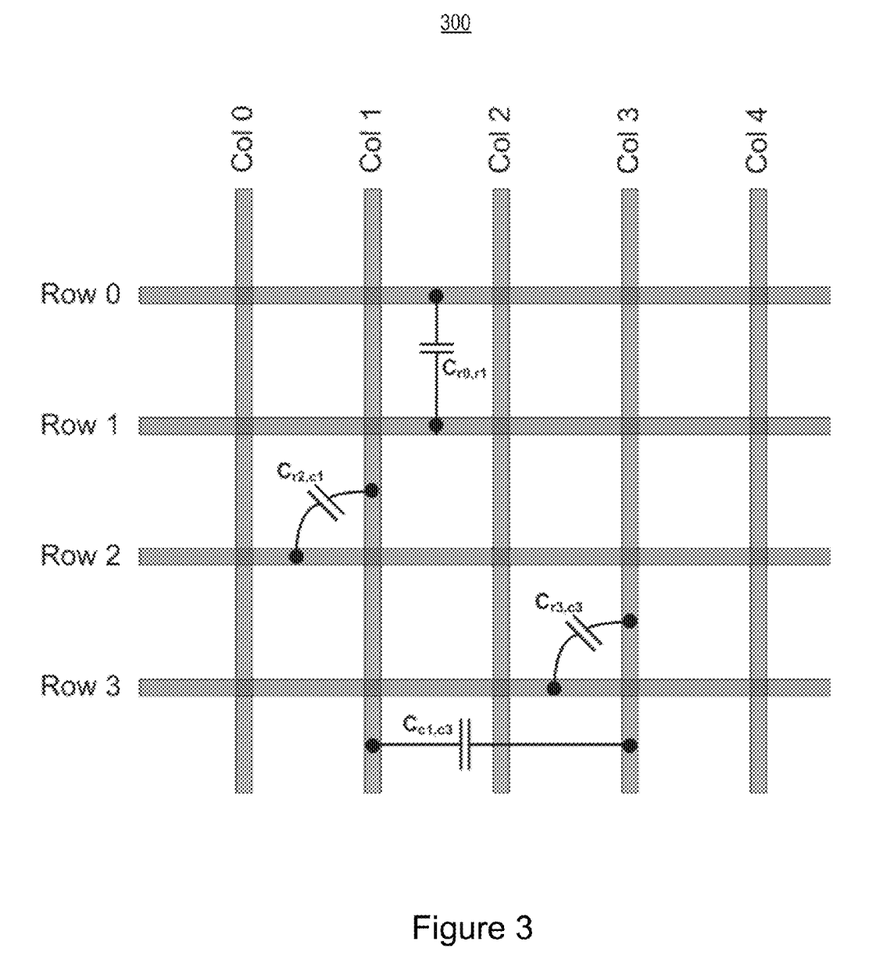
FIG. 3 is a representation of an exemplary mutual capacitance touch panel which may be used in the device of FIG. 1.

FIG. 3 illustrates an example configuration of drive and sense lines making up a mutual capacitive touch panel 300 in accordance with various embodiments. The mutual capacitive touch panel 300 can model the capacitive touch panel 102 of FIG. 1, and may have $N_{row}$ rows and $N_{col}$ columns (e.g., $N_{row}$=4, $N_{col}$=5 in FIG. 3). In this manner, every intersection of each $N_{row}$ rows and $N_{col}$ columns in the mutual capacitive touch panel 300 can be a mutual capacitor and representative of a pixel having a characteristic mutual capacitance. When a voltage is applied to the $N_{row}$ rows or $N_{col}$ columns, a touch event occurring on the capacitive touch panel 102 changes the local electrostatic field resulting in a reduction of the mutual capacitance of one or more pixels. This change in mutual capacitance may be measured to, e.g., determine a touch event location. That is, the controller circuit 104 may use these mutual capacitances to sense touch, as they create a natural grid of capacitive nodes that the controller circuit 104 uses to create a heatmap. However, it should be noted that there are a total of $(N_{row}+N_{col})$ or $(N_{row}+N_{col}+2)$ nodes if a touching finger or stylus and ground node in the capacitive touch panel 300 are included.

A mutual capacitive touch panel, such as the mutual capacitive touch panel 300, may be capable of being stimulated in a variety of different ways, where the manner of stimulation impacts which of the mutual capacitances within the mutual capacitive touch panel are measured. Described in greater detail below, are different operating sample modes indicative of the different ways in which, e.g., a touch front end, such as the TFE 132 of FIG. 1, can stimulate the mutual capacitive touch panel 300 of FIG. 3.

Row-column (RC) mode refers to one sample operating mode of a mutual capacitive touch panel. In RC mode, rows can be driven with transmit (TX) waveforms, while columns can be connected to receive (RX) channels of the TFE 132. Therefore, the capacitance of the mutual capacitors between the rows and the columns of a mutual capacitive touch panel may be detected, yielding an $N_{row} \times N_{col}$ heatmap. In the context of the mutual capacitive touch panel 300 illustrated in FIG. 3, the RC mode can measure the capacitance of the mutual capacitors $C_{r<i>,c<j>}$, where <i> and <j> are integer indices of rows 0-3 and columns 0-4, respectively. It should be noted that a column-row (CR) mode, (i.e., driving columns and sensing rows) can yield essentially the same results as the RC mode.

Referring back to FIG. 1, self-capacitance column (SC) mode is a self-capacitance operating mode that may be supported by an exemplary capacitive touch panel 102. In SC mode, one or more columns can be simultaneously driven and sensed. As a result, the total capacitance of all structures connected to the driven column may be detected.

In column-listening (CL) mode, RX channels of the TFE 132 can be connected to the columns of an exemplary capacitive touch panel 102, while the rows of the exemplary capacitive touch panel 102 can be either be shorted to a low-impedance node (e.g., AC ground), or left floating (e.g., high-impedance) such that there is no transmission of TX waveforms. CL mode can be utilized for listening to any noise and interference present on the columns. The output of the RX channels can be fed to a spectrum estimation processor in order to determine the appropriate TX signal frequencies to use, and a desired interference filter configuration, as will be described in further detail below.

An exemplary TFE 132 can be configured to produce a heatmap by scanning all desired nodes/points of intersection of an exemplary capacitive touch panel 102 (e.g., all of the nodes, or some specified or relevant subset of all of the nodes). This process may be referred to as a frame scan, where the frame scan may run at a rate referred to as the frame rate or scan rate. The frame rate may be scalable. For example, frame scans may be run at a frame rate of 250 Hz for a single touch and a panel size less than or equal to 5.0 inches, 200 Hz for a single touch and a panel size greater than 5.0 inches, or 120 Hz for, e.g., ten touches and a panel size of 10.1 inches. An exemplary controller circuit 104 can be configured to support multiple frame rates, where the frame rate is configurable to maximize performance and power consumption for a given application.

An exemplary controller circuit 104 may "assemble" a complete frame scan by taking a number of intermediate/step scans. Qualitatively, each step scan may result in a set of capacitive readings from the RX channels, though this may not be strictly done in all instances. The controller circuit 104 may perform each step scan at the same or different frame rate, referred to as a step rate. For an RC scan, where transmitters and receivers are connected to the rows and columns, respectively, of a mutual capacitive touch panel, $N_{row}$ step scans could be run to create a full frame scan. Assuming that, e.g., the capacitive touch panel 102 of FIG. 1 is implemented in a tablet computer having 40 rows and 30 columns, the step rate may be at least 8 kHz to achieve a 200 Hz frame rate.

As previously alluded to, in a mutual capacitive touch panel, a touch event may cause a reduction in the mutual capacitance that is measured, such that the heatmap that is created by the TFE 132 will be directly proportional to the measured capacitance, causing a reduction in the heatmap.

Figure 4:
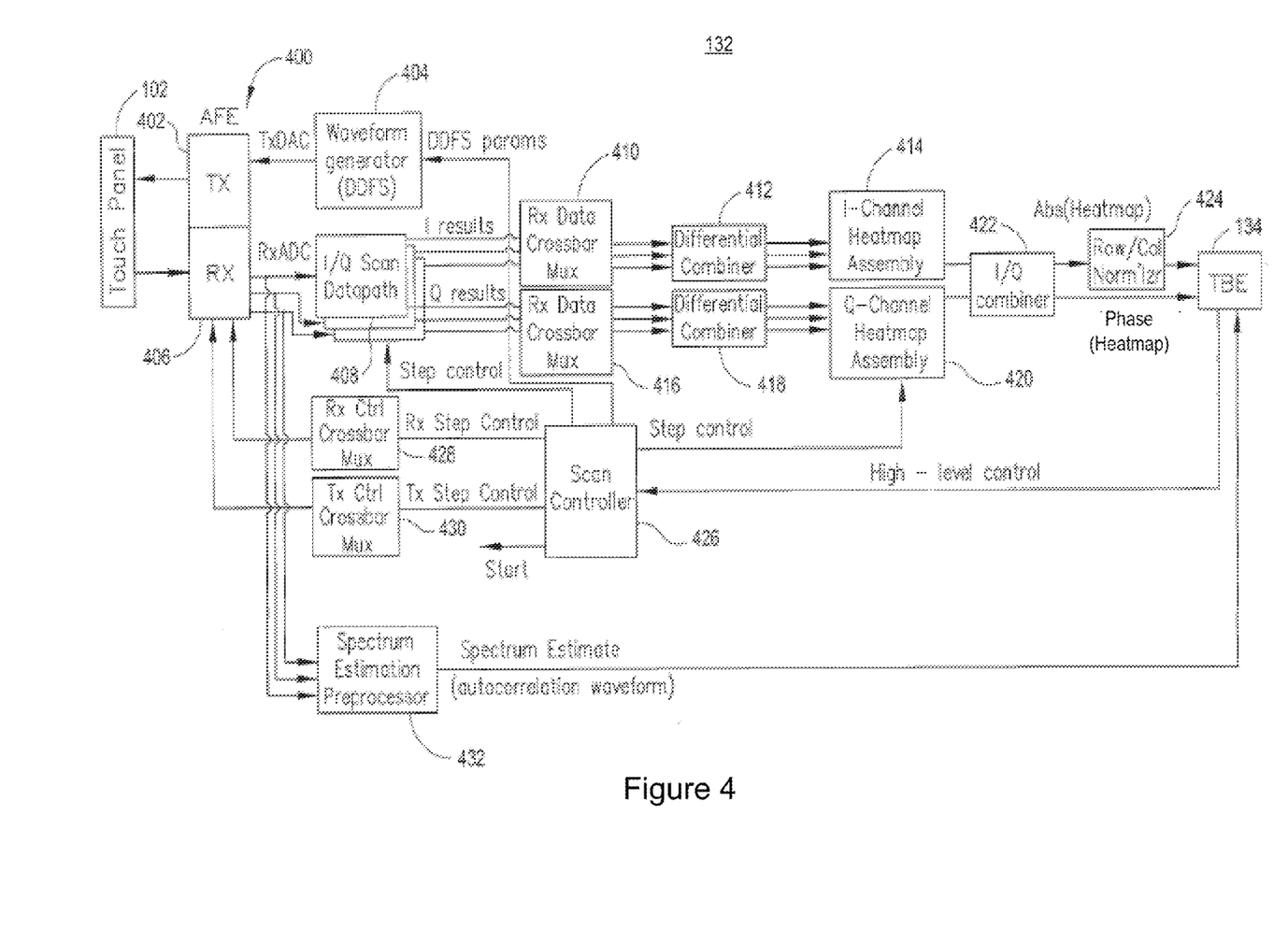
FIG. 4 is an example schematic representation of a touch front end which may be used in the device of FIG. 1.

Referring to FIG. 4, a schematic representation of an exemplary TFE 132 as shown in FIG. 1 is illustrated. The TFE 132 may include 48 physical TX channels connected to, e.g., the rows of the capacitive touch panel 102, and aggregated within a TX channel module 402, and 32 physical RX channels connected to, e.g., the columns of the capacitive touch panel 102, and aggregated within a RX channel module 406. Additionally, and in accordance with other embodiments, the TFE 132 may contain circuitry such as power regulation circuits, bias generation circuits, and/or clock generation circuitry (not shown). The TFE 132 may further include a direct digital frequency synthesis (DDFS) waveform generation module 404, and I/Q scan data paths 408. The TX channel module 402 and the RX channel module 406 may collectively be referred to as analog front end (AFE) 400. The TX channel module 402 can be configured to collectively provide signals to columns/rows of the capacitive touch panel 102, while the RX channel module 406 can be configured to collectively sense signals from the rows/columns of the capacitive touch panel 102.

The TX channel module 402 may further include a digital-to-analog converter (DAC), polarity control circuits, and/or buffers (not shown), while the RX channel module 406 may further include a pre-amplifier, and/or an analog-to-digital converter (ADC) (not shown). The TX channels may be driven by a shared TX data signal, and may each receive a common transmit DAC clock signal to drive the TX DAC. The clock signal may come directly from a frequency locked loop block within the TFE 132, and may be routed to the digital portion of the TFE 132.

Each physical TX channel may further have its own set of channel-specific TX control (TxCtrl) bits that appropriately control various parameters of the TX channel, such as enable/disable, polarity control, and/or gain/phase control. These TxCtrl bits may be updated between subsequent step scans during a frame scan operation. A control signal can be configured to control the transmit polarity of each of the 48 TX channels. As will be described in greater detail below, the polarity of the TX outputs may be modulated in an orthogonal sequence, with each TX output having a fixed polarity during each scan step during a frame scan.

All RX channels may receive a set of common clock signals that can be provided directly from a frequency locked loop block within the TFE 132. This clock signal can also be routed to the digital portion of the TFE 132, and include an RxADCClk signal which drives the RX ADC. Like the physical TX channels, each physical RX channel may also have its own set of channel-specific receive control bits (i.e., RxCtrl bits) that appropriately control various parameters of the RX channel, such as enable/disable and/or gain control. These RX control bits can be updated between subsequent step scans during a frame scan operation. Additionally, there may be a shared set of control setting registers that control all RX channels simultaneously, as well as one or more reset lines, common to all reset channels, that may be asserted in a repeatable fashion prior to each scan step of a frame scan.

Moreover, the TFE 132 can include, for the in-phase (I) results from an I/Q scan data path, a receive data crossbar multiplexer 410, a differential combiner 412, and/or an in-phase channel heatmap assembly module 414. Similarly for the quadrature (Q) results, the TFE 132 can include a receive data crossbar multiplexer 416, a differential combiner 418, and a quadrature-phase channel heatmap assembly module 420. The in-phase results and the quadrature results can be combined in an I/Q combiner 422. The absolute value of the data can be provided to a row and column normalizer 424, and then made available to the TBE 134. Similarly, heatmap phase information from the I/Q combiner 422 can be provided to the TBE 134.

Further still, the TFE 132 may include a scan controller 426, an RX control crossbar multiplexer 428, a TX control crossbar multiplexer 430, and/or a spectrum estimation preprocessor 432, as will be described below in greater detail, for providing a spectrum estimate to the TBE 134. The scan controller 426 can be configured to receive high-level control signals from the TBE 134 to control which columns are provided with TX signals and which rows are sensed, or vice versa.

The RX data crossbar multiplexers 410 and 416, and the RX control crossbar multiplexer 428 together can form an RX crossbar multiplexer which could be used to logically remap the physical RX channels by remapping both their control inputs and data outputs. As such, the control signals routed to these multiplexers may be identical, as the remapping performed by the RX data crossbar multiplexers 410 and 416 and the RX control crossbar multiplexer 428 could be identical. This allows for logical remapping of electrical connectors, such as pins or balls, which connect an integrated circuit, which can include the controller circuit 104, to other circuit components of the device 100. This in turn may enable greater flexibility in routing a printed circuit board from the integrated circuit that includes the controller circuit 104 to the capacitive touch panel 102.

Since the I/Q scan data path 408 outputs complex results, the aforementioned RX crossbar multiplexer may be able to route both the I and Q channels of the I/Q scan data path 408 output by instantiating two separate and identical crossbar multiplexers, i.e., RX data crossbar multiplexers 410 and 416 that share the same control inputs. The RX control crossbar multiplexer 428 can be located between the scan controller 426 and the AFE 400 for remapping the per-channel RX control inputs going into the AFE 400. The structure of the RX control crossbar multiplexer 428 may be the same as that used for RX data crossbar multiplexers 410 and 416.

Because the RX control crossbar multiplexer 428 can be used in conjunction with the RX data crossbar multiplexers 410 and 416 to logically remap the RX channels, it may be programmed in conjunction with the RX data crossbar multiplexers 410 and 416. It should be noted that the programming of the RX control crossbar multiplexer 428 and the RX data crossbar multiplexers 410 and 416 are not necessarily identical. Rather, the programming may be effectuated such that the same AFE to controller channel mapping achieved in, e.g., the RX control crossbar multiplexer 428 multiplexer is implemented in, e.g., the RX data crossbar multiplexers 410 and 416.

The scan controller 426 may form a central controller that can be configured to facilitate scanning of the capacitive touch panel 102 and processing of output data in order to create a heatmap. The scan controller 426 may operate in response to control signals from the TBE 134. The scan controller 426 may support different scan modes, a few examples of which are described below, and where switching between modes can be performed at the request of the processor 122, with some exceptions.

A scan mode referred to as the active scan mode may be considered a standard mode of operation, where the controller circuit 104 actively scans the capacitive touch panel 102 in order to perform measurements to generate a heatmap. Regardless of what form of scan is utilized, the scan controller 426 can step through a sequence of step scans in order to complete a single frame scan.

In a single-frame mode, the controller circuit 104 can initiate one single frame scan at the request of the processor 122. After the scan is complete, heatmap data can be made available to the processor 122, and the scan controller 426 can suspend further operation until additional instructions are received from the processor 122. This mode can be useful in chip debugging.

In a single-step mode, the controller circuit 104 can initiate one single step scan at the request of the processor 122. After the scan is complete, the outputs of the I/Q scan data path 408 can be made available to the processor 122 and the scan controller 426 can suspend further operation until additional instructions are received from the processor 122. This mode can also be useful in chip debugging, as well as chip testing.

In an idle scan mode, a scan can be initiated by the processor 122 in order to run the controller circuit 104 in a lower-performance mode. Typically, this mode is selected when the processor 122 does not detect an active/current touch on the capacitive touch panel 102, but still desires a reasonably fast response to a new touch. Therefore, the processor 122 can remain active and capable of processing heatmap data produced by the TFE 132.

A few primary differences between the active scan mode and the idle scan mode are first, the frame rate in idle scan mode will typically be slower than that used in active scan mode. Duty cycling of the AFE 400 and other power reduction modes can be used in order to reduce total power consumption of the controller circuit 104 during idle scan. Second, the length of time used to generate a single frame scan may be shorter in idle scan mode than in active scan mode. This may be achieved by, among other ways, shortening the duration of a step scan or by performing fewer step scans per frame scan. Reducing total frame scan time may further reduce power (albeit at the expense of reduced heatmap SNR).

A spectrum estimation mode (SEM) may be used to measure the interference and noise spectrum coupling into the RX channels. In particular, the spectrum estimation preprocessor 432 can measure the background levels of interference that couple into the RX channels. Based on this measurement, the processor 122 of the controller circuit 104 may appropriately select TX frequencies that are relatively quiet or interference free, and calculate effective filter coefficients for the filters within the I/Q scan data path 408. This mode is typically used with the CL operating mode. At other times, when SEM is not needed, the spectrum estimation preprocessor 432 may be powered down.

It should be noted that when SEM is used, certain elements of the TFE 132 may be disabled. For example, the TX channel module 402 of the AFE 400 may be powered down, while the RX channel module 406 records background noise and interference signals that couple into the capacitive touch panel 102. The RX data from all of the RX channels can be routed to the spectrum estimation preprocessor 432, which can be configured to perform mathematical preprocessing on this data. The output of the spectrum estimation preprocessor 432 can be an N-point vector of 16-bit results, where N is approximately 200, which can then be handed off to the processor 122 for further analysis and determination of an appropriate TX frequency to use (described in greater detail below).

In addition to the scan modes described above, the controller circuit 104 may employ a set of sleep modes, where various functions/elements of the controller circuit 104 are disabled and/or powered down completely.

As previously described, a frame scan may include a series of step scans. The structure of each step scan may be identical from one step scan to the next within a given frame scan, although the exact values of control data may vary from step scan to step scan. Furthermore, the operation of a given frame scan may be determined by configuration parameters, and may or may not be affected by data values measured by the RX channels. One example of the frame scan logic that the controller circuit 104 may implement is shown below, where the incremental heatmap processing operation is described in greater detail below.

```
// Initialization
Set DDFS parameters;
Clear heatmap_memory;
// Step scan loop
For step_idx = 1 to num_step_scans {
    // Configure circuits according to step_idx
    scan_datapath_control to scan_datapath_parameters[step_idx];
    Assert Rx_reset and wait TBD clock cycles;
    Set AFE_control_inputs to AFE_parameters[step_idx];
    Deassert Rx_reset and wait TBD clock cycles;
    // Run step scan and collect data
    Send start signal to DDFS and scan data path;
    Wait for TBD clock cycles for step scan to complete;
    Pass datapath_results[step_idx] to heatmap assembly block
    // Incremental heatmap processing
} // step_idx loop
```

In order to achieve improved SNR in the heatmap, the controller circuit 104 may provide support for multi-transmit (multi-TX) stimulation of the capacitive touch panel 102. Multi-TX stimulation refers to simultaneously stimulating multiple rows of the capacitive touch panel 102 with a TX signal (or a polarity-inverted version of the TX signal) during each step scan of a complete frame scan. The number and polarity of the rows that are stimulated may be controlled through control registers in the AFE 400. The number of rows simultaneously stimulated during a multi-TX stimulation can be defined as a parameter $N_{multi}$, which may be a constant value from step-to-step within a given frame and also from frame-to-frame.

If $N_{multi}$ rows are simultaneously stimulated during a step scan, it may take at least $N_{multi}$ step scans to resolve all of the pixel mutual capacitances being stimulated. Each receiver can have $N_{multi}$ capacitances being stimulated during a scan step, and hence, there can be $N_{multi}$ unknown capacitances, requiring at least $N_{multi}$ measurements to resolve those unknown capacitance values. During each of the $N_{multi}$ steps, the polarity control of the TX rows can be modulated, e.g., by a set of Hadamard sequences. Once this set of $N_{multi}$ (or more) step scans is complete, the next set of $N_{multi}$ rows can be stimulated in the same fashion, as $N_{multi}$ will likely be less than the number of actual rows in the capacitive touch panel 102.

Accordingly, the processing of the entire capacitive touch panel 102 may occur in blocks, where a first $N_{multi}$ rows of pixels can be resolved during a first batch of step scans, a second $N_{multi}$ rows of pixels can be resolved in a second batch of step scans, and so on, until all the rows of the capacitive touch panel 102 are fully resolved.

In some scenarios, the number of rows will not be an exact multiple of $N_{multi}$. In such situations, the number of rows scanned during a final block of rows may be less than $N_{multi}$. However, $N_{multi}$ scan steps may be performed on these remaining rows, using specified non-square Hadamard matrices.

A differential scan mode is an enhanced scanning mode, where the frame scan operation can be modified to exploit the correlation of the interference signal received across adjacent receive channels. In this scan mode, the number of step scans used to assemble a single frame scan can be doubled. Conceptually, each step scan in a scan sequence can become two step scans: the first step scan being a single-ended or "normal" step scan with the default values for the AFE control registers; and the second being a differential step scan.

Given $N_{RX}$ receive channels, the differential scan mode may yield a total of $2N_{RX}$ receiver measurements per aggregate scan step (e.g., $N_{RX}$ single-ended measurements and $N_{RX}$ differential measurements). These $2N_{RX}$ measurements can be recombined and collapsed into $N_{RX}$ normal measurements in the differential combiners 412 and 418.

The waveform generation module 404 can generate the TX waveform for use with the TX channels to drive either the rows or columns, as appropriate. The waveform generation module 404 may generates a digital sine wave, or other simple periodic waveforms; such as square waves having edges with programmable rise and fall times. The primary output of the waveform generation module 404 can be the data input to the TX channel module 402 (TxDAC). The waveform generation module 404 can receive as input signals, clock and start signals. Upon receiving a start signal from the scan controller 426, the waveform generation module 404 can begin producing digital waveforms for the duration of a single step scan. At the conclusion of the step scan, the waveform generation module 404 can cease operating and wait for the next start signal from the scan controller 426. It should be noted that the waveform generation module 404 may have some amount of amplitude control, although the waveform generation module 404 will typically be run at maximum output amplitude. It should further be noted that signal outputs may be in two's complement format, and the waveform generation module 404 may also provide arbitrary sine/cosine calculation capabilities for the I/Q scan data path 408 and spectrum estimation preprocessor 432.

The differential combiner modules 412 and 418 may allow for operating in differential scan mode, where the RX channels alternate step scans between single-ended measurements and differential measurements. The purpose of the differential combiner modules 412 and 418 (akin to spatial filters) can be to combine the $N_{RX}$ single-ended measurements and ($N_{RX}-1$) differential measurements into a single set of $N_{RX}$ final results for use in the heatmap assembly modules 414 and 420 that follow.

The I and Q heatmap assemblies modules 414 and 420 may take step scan outputs from the I/Q scan data path 408 or differential combiners 412 and 418, if used, and assemble a complete heatmap that can be the primary output of the frame scan operation. In assembling a complete heatmap, all of the step scan outputs may be mathematically combined in an appropriate manner to create estimates of the capacitance values of the individual capacitive pixels in the capacitive touch panel 102. It should be noted that heatmap assembly 414 is for I-channel data and heatmap assembly 420 is for Q-channel data, where each heatmap assembly may operate on either the I-channel or Q-channel data in order to create either an I-channel or a Q-channel heatmap.

The I/Q combiner 422 can be used to combine the I and Q-channel heatmaps into a single heatmap. The primary output of the I/Q combiner 422 can be a heatmap of the magnitude of the I and Q-channel heatmaps (e.g., Sqrt[$I^2+Q^2$]), which can be the heatmap that is handed off to the TBE 134.

The row/column normalizer 424 can be used to calibrate out any row-dependent or column-dependent variation in the panel response. The row/column normalizer 424 can have two static control input vectors, identified as RowFac and ColFac. RowFac can be an Nrow-by-1 vector, and ColFac can be an Ncol-by-1 vector, where each entry has the same dimensions as RowFac.

In one embodiment, the controller circuit 104 can have the capability to allow RowFac and ColFac to be defined either by one time programmable (OTP) bits or by a firmware configuration file. The OTP settings can be used if the manufacturing flow allows for per-module calibration, thus enabling the capability to tune the controller circuit 104 on a panel-by-panel basis. If RowFac and ColFac can only be tuned on in a per-platform basis, then the settings from a firmware configuration file can be used instead.

A touch event can be reported when the measured capacitance of a capacitive pixel (or group of pixels) changes by a large enough amount in a short enough period of time. Depending on desired response time/sensitivity and/or other operating conditions, desired performance, etc., the amount of change and the period of time defined as necessitating a touch event report may vary. However, due to slow environmental shifts in temperature, humidity or causes of drift, the absolute capacitance of a pixel (or group of pixels) can change substantially at a much slower rate. In order to discriminate changes in pixel capacitance due to a touch event from changes due to environmental drift, a baseline tracking filter can be implemented to track the changes in the baseline (e.g., "untouched" or "ambient") value of the capacitance. Subtraction of the baseline capacitance from the input capacitance can yield the change in capacitance due to the touch event.

Figure 5:
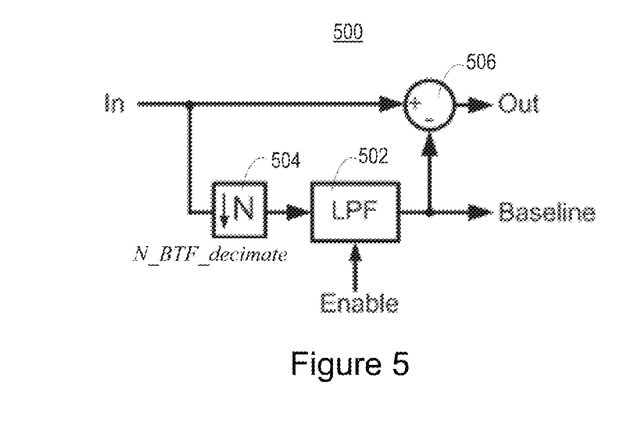
FIG. 5 illustrates an example of a baseline tracking filter which may be used in a controller circuit of the device of FIG. 1.

FIG. 5 illustrates an exemplary baseline tracking filter 500. A sample baseline tracking filter 500 can include a low-pass filter (LPF) 502, a decimator 504 and a combiner 506. An input signal to the baseline tracking filter 500 can be provided to the combiner 506 and the decimator 504. The output signal of the decimator 504 can be provided to the input of the LPF 502. The output of the LPF 502 can be combined with the input signal at the combiner 506. The LPF 502 can have an enable input for controlling operation of the baseline tracking filter 500.

The LPF 502 in the sample baseline tracking filter 500 can be used to improve an estimate of the baseline capacitance value. In accordance with one embodiment, a simple finite impulse response (FIR) moving average filter of length N (also referred to as "comb filter") can be used. Alternatively, and in accordance with another embodiment, a 1-tap infinite impulse response (IIR) filter, also a modified moving average, can be used.

The FIR filter may be used at startup and recalibration of the baseline capacitance value, as it can quickly acquire and track the baseline capacitance value. The IIR filter may be used once the baseline capacitance value is acquired, as it can be a very computationally efficient means to implement an LPF, particularly if k is chosen to be a power of 2. By increasing the value of k, the signal bandwidth of the FIR filter may be set to arbitrarily small values with minimal increase in computational complexity.

The baseline tracking filter 500 can have two outputs, labeled "Out" and "Baseline" as illustrated in FIG. 5. The Baseline output can be an estimate of the current baseline capacitance value of the particular pixel(s) being scanned, and the "Out" output can be the baseline-corrected value of the capacitance value measurement of the particular pixel(s).

The LPF 502 in FIG. 5 can have an enable signal in order to shut down the LPF 502 when a touch event is detected. This can be provided so that the baseline output is not corrupted by spurious data, most likely from a touch event. If the enable signal is low, the LPF 502 can hold its previous output without updating its output with the incoming data, effectively ignoring the incoming data. Once the enable signal is high, the LPF 502 can continue to update its output with the incoming data. Sample logic for generating the enable signal is detailed in the following equation:

$$\text{Enable} = (\text{Out} \leq \text{PosLPFThrEsh}) \;\&\&\; (\text{Out} \geq \text{NegLPFThresh})$$

where PosLPFThresh and NegLPFThresh are configurable parameters.

In a mutual capacitance scan mode, where a touch event causes a reduction in the input data, the NegLPFThresh can be set to $k_T$*TouchThresh, where $0 < k_T < 1$ and TouchThresh can be the touch-detection threshold defined below. These may both be programmable parameters. In such a mutual capacitance scan mode, there is no expected physical mechanism that would cause the input data to exhibit a positive transient. Therefore, PosLPFThresh may be a programmable parameter used to filter out spurious data, should an unexpected positive transient occur.

The timescale of most baseline drift phenomena will generally be far slower than the frame rate of the capacitive touch panel scan. For instance, observed baseline drift in devices have timescales on the order of 1 hour or longer, whereas the frame rate of a scan responsive to a current/active touch event may be on the order of 200 frames/second. Therefore, in order to reduce the computation for baseline tracking, the controller circuit 104 can be configured to scale the update rate of the baseline tracking filter 500. To accomplish this scaling of the update rate, the decimator 504 can be used to decimate the data fed to the baseline tracking filter 500. As a result, the baseline tracking filter 500 can be configured to only operate on every N_BTF_decimate frames of heatmap data, where N_BTF_decimate is a programmable parameter. Therefore, the Baseline output/signal can update at this slower rate. However, the baseline corrected output signal ("Out") may be calculated for every frame.

It should be noted that SEM may cause a configuration change in the AFE 400 which in turn, can alter the gain in the transfer function (e.g., from capacitance values to codes) of the TFE 132 as will be discussed in greater detail. This, in turn, may cause abrupt changes in the heatmap to occur that could accidentally be interpreted as touch events.

A touch event can be detected when the baseline-corrected output exhibits a significant negative shift. The shift in this output may be larger than a programmable parameter, referred to as TouchThresh. Furthermore, since the controller circuit 104 may scan the capacitive touch panel 102 at upwards of 200 Hz, and a human finger or stylus moves at a much slower timescale, a programmable amount of debounce, referred to as TouchDebounce, can also be included. Therefore, before a touch is recognized, the output of the baseline filter may be more negative than the TouchThresh value for at least TouchDebounce frames. It is likely that TouchDebounce will be a small value to ensure a total touch response time faster than 10 ms.

Figure 6:
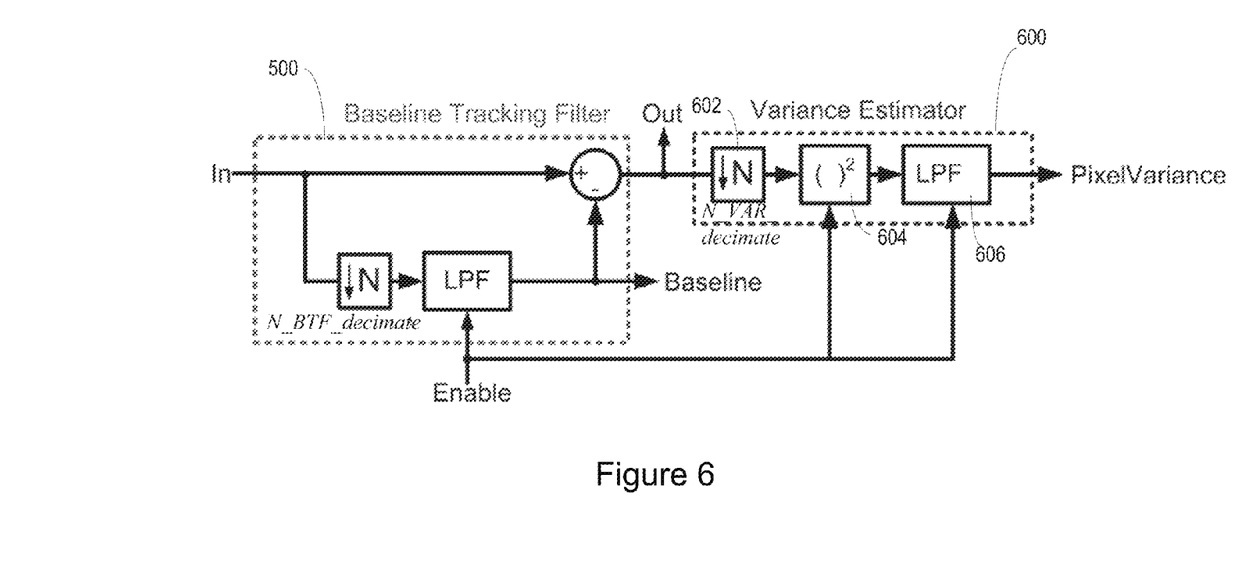
FIG. 6 illustrates an example of a first variance estimator which may be used in conjunction with the example baseline tracking filter of FIG. 9.

The TBE 134 may use an estimate of the noise level in the capacitive touch panel 102 in order to properly threshold touch "blobs" (touches used for determining relative pixel intensity) during the touch detection process. The noise level can be detected by observing noise at the output of the baseline tracking filter 500 illustrated in FIG. 6. FIG. 6 further illustrates an exemplary variance estimator 600 that can be used in conjunction with the sample baseline tracking filter 500. As illustrated in FIG. 6, the baseline tracking filter 500 can have its Out output coupled to an input of the variance estimator 600. The variance estimator 600 can include a decimator 602, a signal squarer 604 and its own LPF 606. The variance estimator 600, in accordance with certain embodiments, may be a mean-square estimator, as the output of the baseline tracking filter 500 is zero-mean. Hence the mean-square is equal to the variance.

In order to lower the computational requirements for the variance estimator 600, the data entering the variance estimator 600 can be decimated in the decimator 602 by the factor, N_VAR_decimate. In various embodiments, the LPF 606 in the variance estimator 600 may be, among other things, a comb-filter or a modified moving average filter. The length of the response of the LPF 606 may be a programmable parameter, averaging data over as many as one hundred or more frames. In order to lower memory requirements, the modified moving average filter may be used.

As with the baseline tracking filter 500, the LPF 606 in the variance estimator 600 can have an input for an enable signal. The enable signal can be low when a pixel in question is being touched. Otherwise, the variance estimate may be corrupted by the touch signal. When the enable signal is low, the LPF 606 can retain its current state, effectively ignoring the data coming into the variance estimator 600.

The output of the variance estimator 600 can be the variance of a single pixel in the capacitive touch panel 102. Therefore, this provides an independent variance estimate of each pixel in the panel. To get an estimate of the variance across the capacitive touch panel 102, the controller circuit 104 may average the per-pixel variances across an entire frame scan.

Figure 7:
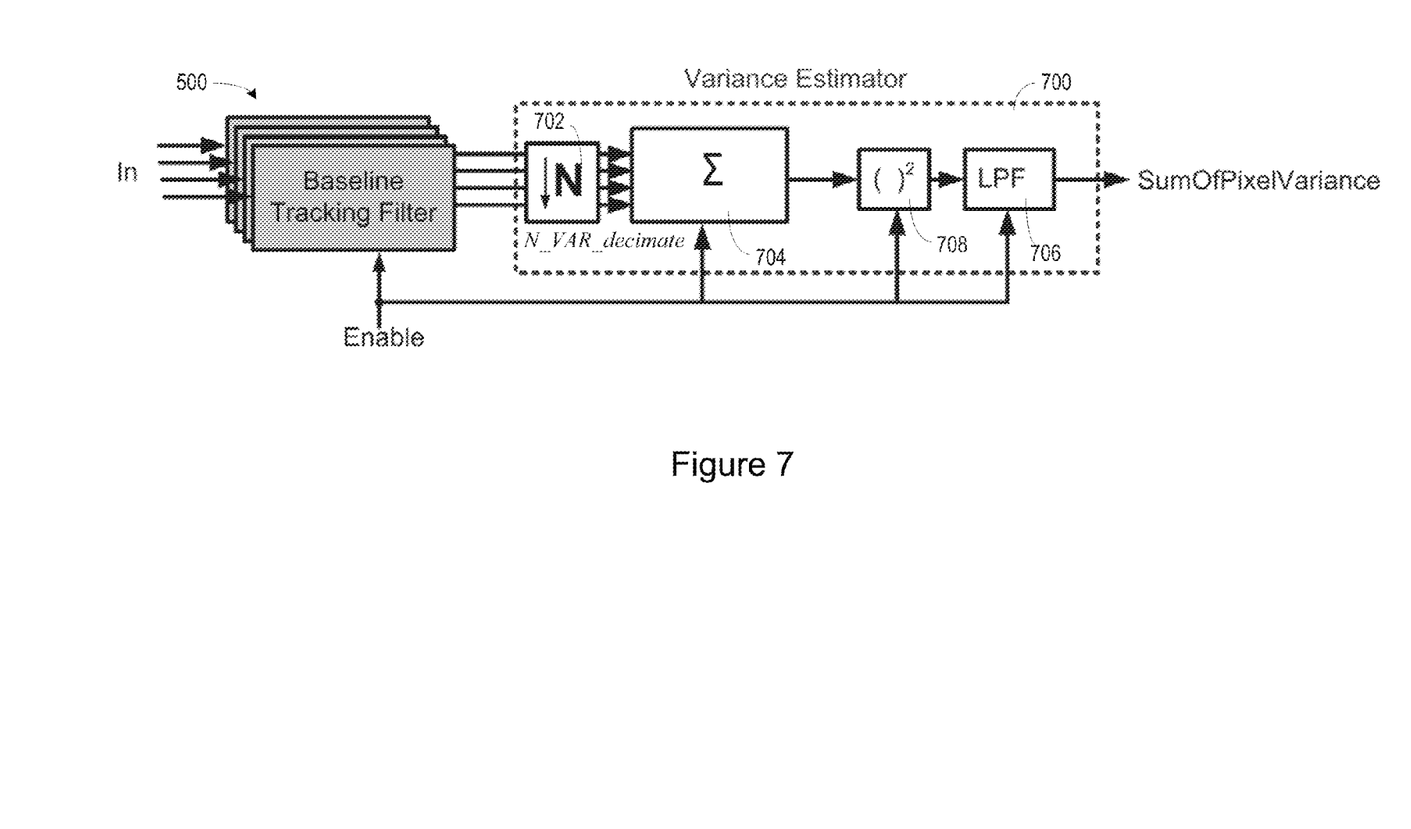
FIG. 7 illustrates an example of a second variance estimator which may be used in conjunction with the example baseline tracking filter of FIG. 9.

Alternatively, if only a single per-frame variance estimate is needed, the controller circuit 104 can follow an approach, such as that illustrated in FIG. 7. FIG. 7 illustrates the use of another variance estimator 700 in conjunction with multiple baseline tracking filters (such as baseline tracking filter 500 of FIG. 5). As illustrated in FIG. 7, multiple per-pixel baseline tracking filters 500 can be grouped together, and all of the resulting baseline-corrected outputs from the baseline tracking filters 500 can be passed to the variance estimator 700.

Like the variance estimator 600 of FIG. 6, the variance estimator 700 can include a decimator 702, a signal squarer 708 and its own LPF 706. The variance estimator 700 can further include a summer 704. The variance estimator 700 may combine the outputs of the multiple baseline tracking filters 500 into a single average value by summing the baseline-corrected outputs across the entire frame in the summer 704. This averaged value can then be passed to a square-and-filter estimator formed by the signal squarer 708 and the LPF 706 (as described above with regard to FIG. 6). Assuming that the noise is uncorrelated from pixel-to-pixel, the output of the variance estimator 700 can be equal to the sum of all the pixel variances reported by baseline tracking filters 500 and variance estimator 600. In order to generate the average pixel variance across the panel, this result may be divided by the total number of pixels in the capacitive touch panel 102. To generate an estimate of the standard deviation of the noise, the controller circuitry 104 may take the square root of the variance.

As previously described, and due to, e.g., environmental drift, a baseline tracking filter can be implemented to track the changes in the baseline capacitance value. That is, the baseline capacitance value may wander or slowly shift over time due to slow environmental changes, such as changes in ambient temperature, humidity, etc. The baseline capacitance value may also be subject to sudden changes in ambient capacitance as a result of, e.g., a water droplet or dirt particle contacting the capacitive touch panel 102, or even an accidental false touch. Such changes in the baseline capacitance value can lead to a severe degradation in touch performance/response if not addressed, e.g., by recalibrating the baseline capacitance value.

For example, and with respect to a water droplet contacting the capacitive touch panel 102, such contact may be characterized as an "anti-touch" event, where the baseline capacitance value may be acquired by the baseline tracking filter 500 while a water droplet is present on the capacitive touch panel 102. As a result, removal of the water droplet may appear to the digital touch subsystem 120, as a "persistent" touch at the location where the water droplet previously contacted the capacitive touch panel 102. In other words, and instead of the baseline capacitance value being indicative of an untouched or ambient condition, such that any large enough change in capacitance of a pixel(s) over a short enough period of time is reported as a touch event, it is the absence of a touch that would be reported as being a touch event.

As also previously described, SEM may be used to measure the interference and noise spectrum coupling into the RX channels. To that end, the spectrum estimation preprocessor 432 may determine the background levels of interference that couple into the RX channels so that the controller circuit 104 may appropriately select alternative TX frequencies that are relatively quiet or interference free. Accordingly, and when it is determined that a change in TX frequency is warranted to avoid interference and/or noise, the waveform generator module 404 may generate TX waveforms at an alternative TX frequency. That is, the capacitive touch panel 102 may be excited by transmitting signals at a known frequency and measuring the amplitude of the received signals from capacitance touch panel 102 at the known frequency. In order to prevent jamming from noise sources, such as the display 112 (being located proximate to the capacitive touch panel 102), the controller circuit 104 may change TX frequencies adaptively.

For example, if, e.g., a steep drop in SNR (or other similar metric, such as a large increase in noise regardless of signal) occurs, an SEM scan may be effectuated to retune the capacitive touch panel 102 to an alternative TX frequency and alternative RX filter coefficients. The trigger threshold(s) for performing an SEM scan may be predefined or adaptable and determined by the controller circuit 104. Alternatively, a noise estimation algorithm may be run periodically or at-will during active scan mode, such that when SNR drops by, e.g., 3-6 dB, the controller circuit 104 may be triggered into calculating alternative TX frequencies and alternative RX filter coefficients.

Additionally, and to minimize TX frequency jumping, a TX frequency table and management algorithm may be utilized to maintain known TX frequencies to avoid. For example, certain TX frequencies are known to badly interfere with the capacitive touch panel 102, and therefore, any frequencies that fall within some window about such known TX frequencies may be avoided. In accordance with other embodiments, and instead of maintaining a table of "bad" TX frequencies to avoid, known "good" TX frequencies may be maintained in an alternative TX frequency table taking into account, e.g., certain RX considerations such as filtering capabilities of the digital touch subsystem 120. For example, statistics may be taken regarding various TX frequencies used in driving the TX channels of the capacitive touch panel 102. A good TX frequency might be one where repeated noise estimates indicate that the TX frequency kept a good SNR.

It should be noted that TX frequencies may migrate from good to bad and vice versa, where different constants and/or thresholds may be used to determine whether a TX frequency is good or bad. To minimize processing resources/time, the digital touch subsystem 120 may be configured to match alternative TX frequencies to known good TX frequencies for use. Furthermore, certain considerations can be taken into account when changing to an alternative TX frequency. For example, when changing to an alternative TX frequency, gain of the AFE 400 may change due to, e.g., changes in the TX transfer function, different capacitive touch panel 102 response at the alternative TX frequency, new bandpass filter tuning for the AFE 400, etc.

To minimize the impact of changing TX frequencies, SEM may be implemented with a hysteresis function to avoid changing TX frequencies too often. For example, potential changes to an alternative TX frequency may be assessed to determine whether the improvement that would be gained is enough to warrant jumping to the alternative TX frequency.

Moreover, the baseline capacitance value may also be frequency dependent, and may change when the TX frequency is changed. For capacitive touch panels that employ a small number of discrete frequencies, baseline capacitance values may be maintained for each frequency. However, in systems or devices that make use of a large selection of possible TX frequencies for maximum diversity, or apply adaptive techniques capable of supporting many different frequencies, maintaining a baseline capacitance value for each frequency may be impractical and such alternative baseline capacitive values may not necessarily be representative of a true baseline ("no touch") condition. Further still, a plethora of real-world scenarios and conditions arise, the prediction of which is difficult, and more than one cause for a false touch or sudden ambient change may exist. For example, the aforementioned water condition and false touch presence may often be mixed.

In accordance with various embodiments, baseline capacitance values for alternative TX frequencies can be calculated based on an existing baseline capacitance value at an active/operating TX frequency, i.e., the TX frequency at which TX waveforms are currently being transmitted. By maintaining baselines at different frequencies, should the operating frequency become jammed with noise, the operating frequency may be switched over to an alternative frequency having a corresponding baseline capacitance value without loss of scan rate. In order to maintain alternative baseline capacitance values, frame scans may be scheduled periodically on those alternative frequencies. It should be noted that the baseline capacitance value corresponding to an alternative TX frequency may be calculated from an operating TX frequency even in the presence of sudden ambient capacitance changes (e.g., water droplet or dirt particle presence, false touches).

Alternative TX frequency frame scans (e.g., active scan mode frame scanning at an alternative TX frequency) may be scheduled to run back to back with operating TX frequency frame scans (e.g., active scan mode frame scanning at the operating TX frequency) to minimize any drop in frame rate. As a result of the alternative TX frequency frame scans, baseline capacitance values at an alternative TX frequency may be captured and maintained, as will be described in greater detail below. The alternative TX frequency frame scans may also report touches if a noise estimate is determined to be low enough and the baseline capacitance value is already established.

In accordance with one embodiment, if noise is detected on the operating TX frequency and a baseline capacitance value has already been calculated at an appropriate alternative TX frequency, the operating TX frequency may be switched to the alternative TX frequency during the next scheduled frame scan of the capacitive touch panel 102. In this instance, the baseline capacitance value may have already been determined in the background prior to the operative TX frequency becoming jammed with noise.

In accordance with another embodiment and if, on the other hand, noise is detected on the operating TX frequency and no baseline capacitance value has yet been captured for a desired alternative TX frequency, a baseline capacitance value can be generated from the baseline capacitance value associated with the operating TX frequency. Thereafter, the alternative TX frequency may be utilized.

Figure 8:
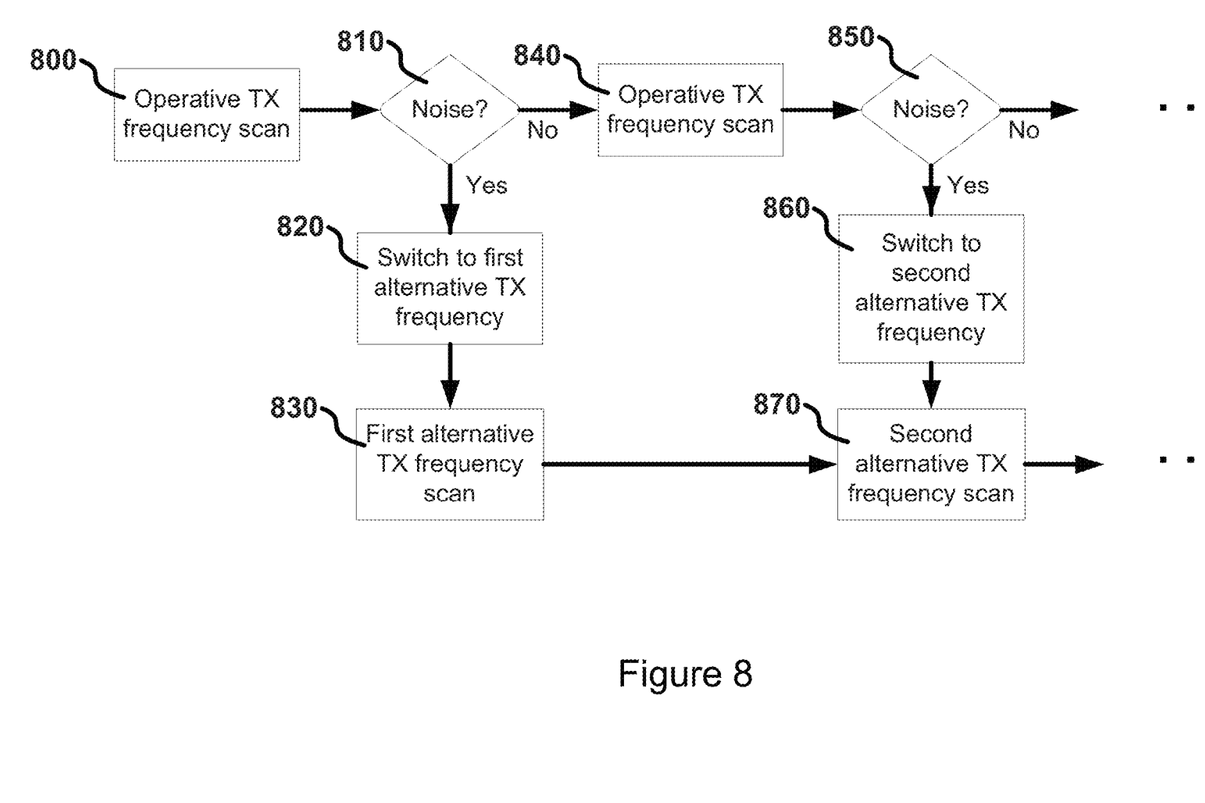
FIG. 8 illustrates example processes performed for switching to an alternative frequency from an operative frequency in accordance with various embodiments.

FIG. 8 illustrates example processes performed in accordance with various embodiments to handover from an active/operative TX frequency to an alternative TX frequency. Active scan mode frame scans at an operative TX frequency may be captured (800). As previously described, noise estimates may be determined (810), and if no noise is detected, another active scan mode frame scan at the operative TX frequency may be captured (840), and so on. These frame scans may be hardware implemented frame scans. Simultaneously, or at appropriate time periods between the active scan mode frame scans (depending on, e.g., whether SEM is required), a firmware implemented frame scan may be captured at a first alternative TX frequency (830). As previously described, frame scans at alternative TX frequencies may be scheduled back to back. Accordingly, another firmware implemented frame scan may be captured at a second alternative TX frequency (870). These alternative TX frequencies may be determined from TX frequencies maintained in the aforementioned table of good TX frequencies.

However, if noise is detected on the operative TX frequency, the capacitive touch panel 102 may be retuned to the first alternative TX frequency (820) at the time of the next frequency scan if a corresponding alternative baseline capacitance value at the first alternative TX frequency is available. If the corresponding baseline capacitance value at the first alternative TX frequency is not yet available, one may be generated as will be described below prior to switching to the first alternative TX frequency. It may be that noise is detected (850) only after the operative TX frequency scan (840) in which case, the capacitive touch panel 102 may be returned to the second alternative TX frequency (860) if a corresponding baseline capacitance value at the second alternative TX frequency is available. It should be noted that the first alternative TX frequency, the second alternative TX frequency, etc. may be maintained in the aforementioned good TX frequency table.

Figure 9:
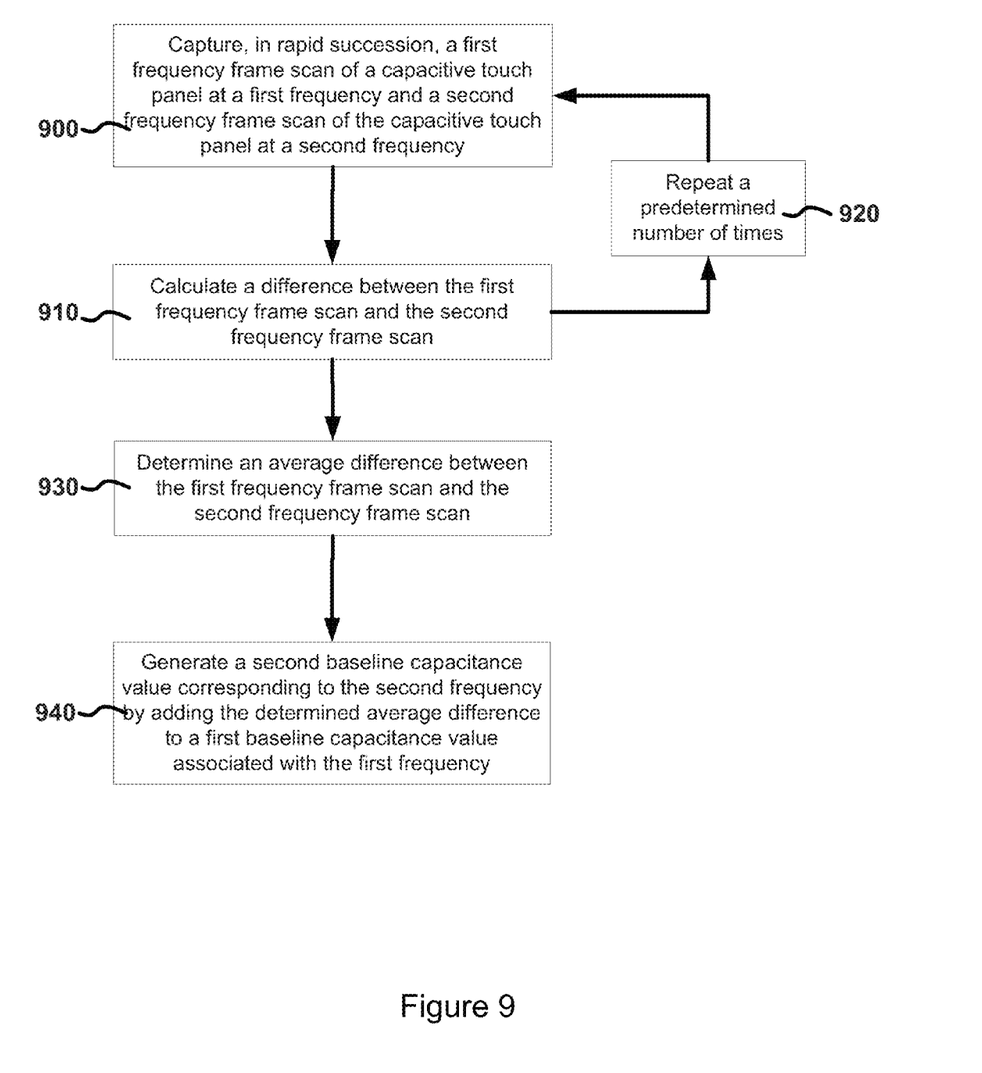
FIG. 9 illustrates example processes which may be performed when calculating an alternative baseline capacitance value.

FIG. 9 illustrates example processes performed in accordance with various embodiments to generate a baseline capacitance value at an alternative TX frequency based on a baseline capacitance value at an operative TX frequency. A first frequency frame scan of a touch capacitive panel at a first frequency can be captured, and a second frequency frame scan of the touch capacitive panel at a second frequency can be captured in rapid succession (900). For example, an active scan mode frame scan may be captured at an operative TX frequency being utilized to drive the TX channels of the capacitive touch panel 102, and an active scan mode frame scan may be performed at an alternative TX frequency that will be used to drive the TX channels of the capacitive touch panel 102 when, e.g., noise is detected at the operative TX frequency. The size of the capacitive touch panel 102 may be used to determine how "rapid" the first and second frequency frame scans are successively captured. First and second frequency frame scans may be captured as fast as possible to avoid any large time gaps. For example, the digital touch subsystem 120 may be configured to capture the second frequency frame scan substantially immediately after the first frequency frame scan is captured, and the bigger the capacitive touch panel 102 is, the longer it may take to capture each frame scan.

A difference can be calculated between the first frequency frame scan and the second frequency frame scan (910). As previously described, the baseline capacitance value can be a measure of the untouched capacitance for the capacitive touch panel 102, and may be utilized by the TBE 134 to determine if a touch event has occurred. A heatmap produced by a frame scan can be compared with the baseline capacitance value, for example, by subtracting the baseline capacitance value(s) (pixel-by-pixel) from the capacitance values reflected in heatmap. If no touch event has occurred, the result of the subtraction may be approximately zero, i.e., without a touch occurrence or some other presence (e.g., a water droplet), the capacitance of the capacitive touch panel 102 may be approximately that of the baseline capacitive value. In this instance, taking the difference between frame scans at the first and second frequencies may result in a delta value that negates the effect of touch event movement as will be described in greater detail below.

The capturing of the first frequency frame scan, the capturing of the second frequency frame scan, and the calculation of the difference between the first frequency frame scan and the second frequency frame scan can be repeated for some predetermined number of times (920). This repetition may further refine the basis on which to generate a baseline capacitance value. The number of times the capturing of the first and second frequency frame scans and the calculation of the difference between the first and second frequency frame scans is repeated may vary depending on how precise a baseline capacity value is desired.

An average difference/delta value between the first frequency frame scan and the second frequency frame scan can be determined (930), and an alternative baseline capacitance value corresponding to the second frequency can be generated by adding the determined average difference/delta value to an operative baseline capacitance value associated with the first frequency (940).

By capturing the first and second frequency frame scans in rapid succession and determining an average difference/delta value, a reliable baseline capacitance value at an alternative TX frequency may be obtained. For example, even if the position of an inadvertent touch event changes, the amount of movement that will have occurred between the capturing of the first and second frequency frame scans may be small due to the rapid succession in which the capturing occurs. As a result, the averaging of the difference between the observed baseline capacitance values may negate, or at least minimize the overall impact of the movement.

In accordance with various embodiments, and during the capturing of the first and second frequency frame scans, and the calculating of the difference therebetween, a calculated difference may be discarded if a large noise signal is detected. As previously described, a level of noise may be estimated periodically or at-will, and therefore, over the span of repeated first and second frequency frame scans, various embodiments may be insensitive to such anomalies, and the generated alternative baseline capacitance value at alternative TX frequencies may be more reliable.

Various embodiments may allow for many possible capacitive touch panel excitation frequencies to be employed without the risk of capturing a "corrupt" baseline capacitance value when the frequency changes. In turn, a greater choice of excitation frequencies may allow the capacitive touch panel to operate effectively in a greater variety of noisy conditions, and frequency transitions may be performed seamlessly with little or no disruption to a user. Moreover, in obtaining an alternative baseline capacitance value, it may not be necessary to check for a "zero" condition. Further still, the environmental conditions that can be addressed by various embodiments may exist for any touch screen device in the foreseeable future, making baseline capacitance value calibration even more valuable.

The various diagrams illustrating various embodiments may depict an example architectural or other configuration for the various embodiments, which is done to aid in understanding the features and functionality that can be included in those embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality is presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   determining a first plurality baseline capacitance values of a capacitive touch panel corresponding to a first frequency;
   capturing in rapid succession, a first frequency frame scan of the capacitive touch panel at the first frequency and a second frequency frame scan of the capacitive touch panel at a second frequency;
   calculating differences in capacitance values of the capacitive touch panel between the first frequency frame scan and the second frequency frame scan;
   repeating, for a predetermined number of times:
   the capturing of the first frequency frame scan;

the capturing of the second frequency frame; and
the calculation of the differences in capacitance values of the capacitive touch panel between the first frequency frame scan and the second frequency frame scan,
determining average differences in capacitance values of the capacitive touch panel between the first frequency frame scans and the second frequency frame scans; and
generating a second plurality of baseline capacitance values of the capacitive touch screen corresponding to the second frequency by adding the determined average differences in capacitance values of the capacitive touch panel to the first plurality of baseline capacitance values of the capacitive touch screen corresponding to the first frequency.

2. The method of claim 1 further comprising:
simultaneously with the capturing of the first frequency frame scan and the second frequency frame scan, detecting if noise signals associated with the first frequency frame scans or the second frequency frame scans exist; and
discarding the calculated differences in capacitance values of the capacitive touch screen if a large noise signal is detected.

3. The method of claim 1 further comprising, retuning the capacitive touch panel to the second frequency from the first frequency upon detecting noise on the first frequency.

4. The method of claim 3 further comprising, utilizing the second plurality of baseline capacitances of the capacitive touch screen value instead of the first plurality of baseline capacitance values in determining whether to report a touch event occurring on the capacitive touch panel.

5. The method of claim 3, wherein the generation of the second plurality of baseline capacitance values of the capacitive touch screen occurs prior to the detection of the noise on the first frequency.

6. The method of claim 3, wherein the generation of the second plurality of baseline capacitance values of the capacitive touch screen occurs subsequent to the detection of the noise on the first frequency.

7. The method of claim 1, wherein the first frequency comprises an active transmit frequency on which transmit channels of the capacitive touch panel are excited.

8. The method of claim 1, wherein the second frequency comprises an alternative frequency determined from a table of known transmit frequencies.

9. The method of claim 1, wherein the second plurality of baseline capacitance values of the capacitive touch screen are insensitive to sudden ambient changes and moving touch events affecting the capacitive touch panel.

10. A system, comprising:
a capacitive touch panel; and
a digital touch subsystem communicatively coupled to the capacitive touch panel and configured to:
determine a first plurality of baseline capacitance values of the capacitive touch panel corresponding to a first frequency;
repeat, for a predetermined number of times:
capture in rapid succession, a first frequency frame scan of the capacitive touch panel at the first frequency and a second frequency frame scan of the capacitive touch panel at a second frequency; and
calculate differences in capacitance values of the capacitive touch panel between the first frequency frame scan and the second frequency frame scan;
determine average differences in capacitance values of the capacitive touch panel between the first frequency frame scans and the second frequency frame scans; and
generate a second plurality of baseline capacitance values of the capacitive touch screen corresponding to the second frequency by adding the determined average differences in capacitance values of the capacitive touch panel to the first plurality of baseline capacitance values of the capacitive touch screen corresponding to the first frequency.

11. The system of claim 10, the digital touch subsystem further configured to:
simultaneously with the capturing of the first frequency frame scan and the second frequency frame scan, detect if noise signals associated with the first frequency frame scans or the second frequency frame scans exist; and
discard the calculated differences in capacitance values of the capacitive touch screen if a large noise signal is detected.

12. The system of claim 10, the digital touch subsystem further configured to retune the capacitive touch panel to the second frequency from the first frequency upon detecting noise on the first frequency.

13. The system of claim 12, the digital touch subsystem further configured to use the second plurality of baseline capacitances of the capacitive touch screen value instead of the first plurality of baseline capacitance values in determining whether to report a touch event occurring on the capacitive touch panel.

14. The system of claim 12, wherein the generation of the second plurality of baseline capacitance values of the capacitive touch screen occurs prior to the detection of the noise on the first frequency.

15. The system of claim 12, wherein the generation of the second plurality of baseline capacitance values of the capacitive touch screen occurs subsequent to the detection of the noise on the first frequency.

16. The system of claim 10, wherein the first frequency comprises an active transmit frequency on which transmit channels of the capacitive touch panel are excited.

17. The system of claim 10, wherein the second frequency comprises an alternative frequency determined from a table of known transmit frequencies.

18. The system of claim 10, wherein the second plurality of baseline capacitance values of the capacitive touch screen are insensitive to sudden ambient changes and moving touch events affecting the capacitive touch panel.

19. A method, comprising:
determining a first plurality of baseline capacitance values of a capacitive touch panel corresponding to a first frequency;
repeating, for a predetermined number of times:
capturing in rapid succession, a first frequency frame scan of the capacitive touch panel at the first frequency and a second frequency frame scan of the capacitive touch panel at a second frequency; and
calculating differences in capacitance values of the capacitive touch panel between the first frequency frame scan and the second frequency frame scan;
determining average differences in capacitance values of the capacitive touch panel between the first frequency frame scans and the second frequency frame scans; and
generating a second plurality of baseline capacitance values of the capacitive touch screen corresponding to the second frequency by adding the determined average differences in capacitance values of the capacitive touch panel to the first plurality of baseline capacitance values of the capacitive touch screen corresponding to the first frequency.

20. The method of claim 19, further comprising retuning the capacitive touch panel to the second frequency from the first frequency upon detecting noise on the first frequency.

* * * * *